US012729138B2

(12) United States Patent
Jensen et al.

(10) Patent No.: US 12,729,138 B2
(45) Date of Patent: Sep. 8, 2026

(54) WASTEWATER PROCESSING SYSTEM AND APPARATUS

(71) Applicant: Skagen Energy Services Inc., Red Deer (CA)

(72) Inventors: Kent Jensen, Red Deer (CA); Grant Jensen, Red Deer (CA); Jesse Madro, Red Deer (CA)

(73) Assignee: Skagen Energy Services Inc., Red Deer (CA)

( * ) Notice: Subject to any disclaimer, the term of this patent is extended or adjusted under 35 U.S.C. 154(b) by 294 days.

(21) Appl. No.: 18/261,720

(22) PCT Filed: Jan. 19, 2022

(86) PCT No.: PCT/CA2022/050073
§ 371 (c)(1),
(2) Date: Jul. 17, 2023

(87) PCT Pub. No.: WO2022/155735
PCT Pub. Date: Jul. 28, 2022

(65) Prior Publication Data

US 2024/0076204 A1 Mar. 7, 2024

Related U.S. Application Data

(60) Provisional application No. 63/139,193, filed on Jan. 19, 2021.

(51) Int. Cl.
*C02F 1/10* (2023.01)
*B01D 1/00* (2006.01)
(Continued)

(52) U.S. Cl.
CPC ............ *C02F 1/048* (2013.01); *B01D 1/0041* (2013.01); *B01D 1/0058* (2013.01); *C02F 1/10* (2013.01);
(Continued)

(58) Field of Classification Search
CPC .... C02F 1/048; C02F 1/10; C02F 1/16; C02F 5/083; C02F 2001/007; C02F 2101/322;
(Continued)

(56) References Cited

U.S. PATENT DOCUMENTS 5,032,230 A 7/1991 Shepherd
5,342,483 A 8/1994 Hwang
(Continued)

FOREIGN PATENT DOCUMENTS

DE 2409720 A1 9/1975
RU 2759105 C1 * 11/2021 ........... B01D 1/0058
(Continued)

OTHER PUBLICATIONS

Escapnet full English translation of Patent Publication DE2409720A1, Sep. 11, 1975. (Year: 1975).*
(Continued)

*Primary Examiner* — Joseph W Drodge
(74) *Attorney, Agent, or Firm* — Holzer Patel Drennan

(57) ABSTRACT

A water treatment system is provided for removing contaminants from feed water. The system receives feed water at a stripper tower, which removes VOCs from the feed water and directs the VOCs to a heating stage to be eliminated. Hot gases are directed from the heating stage to an evaporation stage. The VOC-free water from the stripper tower is also directed to the evaporation stage. The hot gases are brought into contact with the VOC-free water and evaporates the water. The exhaust gases in the evaporation stage are vented. A slurry of precipitated solids and water are removed from the evaporation stage to be disposed of or directed to a decanter stage to separate the liquid portion of the slurry from the solids portion. The liquid portion can be directed
(Continued)

back to the evaporation stage. The exhaust gases in the evaporation stage can also be recirculated to the stripper tower.

17 Claims, 6 Drawing Sheets

(51) Int. Cl.

| | |
|---|---|
| ***C02F 1/04*** | (2023.01) |
| ***C02F 1/16*** | (2023.01) |
| ***C02F 5/08*** | (2023.01) |
| *C02F 1/00* | (2023.01) |
| *C02F 101/32* | (2006.01) |

(52) U.S. Cl.

CPC ................ *C02F 1/16* (2013.01); *C02F 5/083* (2013.01); *C02F 2001/007* (2013.01); *C02F 2101/322* (2013.01); *C02F 2301/046* (2013.01)

(58) Field of Classification Search

CPC ........ C02F 2301/046; C02F 1/04; C02F 1/20; C02F 1/02; C02F 1/38; C02F 1/385; B01D 1/0041; B01D 1/0058; B01D 19/00; B01D 19/001; B01D 19/0042; B01D 19/0047; B01D 19/0068; B01D 19/0073; B01D 19/0422; B01D 21/26; B01D 21/262

USPC ......... 95/245, 251, 254, 258, 259, 263, 264; 96/182, 202, 218

See application file for complete search history.

(56) References Cited

U.S. PATENT DOCUMENTS

| | | | | |
|---|---|---|---|---|
| 6,712,882 | B1 * | 3/2004 | De Bie | B01D 5/009 210/691 |
| 7,845,314 | B2 | 12/2010 | Smith | |
| 9,156,711 | B2 | 10/2015 | Duesel et al. | |
| 9,199,861 | B2 | 12/2015 | Duesel, Jr. et al. | |
| 10,780,368 | B2 | 9/2020 | Zupancic et al. | |
| 10,946,301 | B2 | 3/2021 | Duesel, Jr. et al. | |
| 2006/0196358 | A1 * | 9/2006 | Levin | B01D 3/343 95/263 |
| 2011/0303368 | A1 | 12/2011 | Panz et al. | |
| 2013/0213584 | A1 * | 8/2013 | Duesel | C02F 1/048 159/16.2 |

FOREIGN PATENT DOCUMENTS

| | | | | |
|---|---|---|---|---|
| SU | 1321685 A * | 7/1987 | | B01D 1/14 |
| WO | WO-2010017652 A1 * | 2/2010 | | C01C 1/24 |

OTHER PUBLICATIONS

English translation of SU1321685A1, Jul. 7, 1987. (Year: 1987).*

WO_2010017652A1, Feb. 18, 2010. (Year: 2010).*

English translation of RU_2759105_C1, Nov. 9, 2021. (Year: 2021).*

International Search Report and Written Opinion, dated Apr. 20, 2022, from corresponding PCT application No. PCT/CA2022/050073.

* cited by examiner

WASTEWATER PROCESSING SYSTEM AND APPARATUS

CROSS-REFERENCE TO RELATED APPLICATIONS

This application claims the benefit of U.S. Provisional Application 63/139,193 filed Jan. 19, 2021 the entirety of which is incorporated fully herein by reference.

FIELD

Embodiments of the disclosure relate to methods and apparatus relating to treatment of wastewater. In particular, embodiments herein relate to removal of contaminants from water using heat.

BACKGROUND

Present water treatment systems typically evaporate feed water to separate the water from undesirable contaminants, which are disposed of or processed further after separation. The evaporated water is either vented with other produced gases or collected for further processing. Separation of contaminants from the feed water typically involves precipitation out of water during the evaporation process.

Depending on the operation that generated the feed water, the water may contain volatile organic compounds (VOCs) dissolved therein. VOCs are not precipitated out of the feed water as they evaporate at relatively low temperatures and thus are typically exhausted with the evaporated water. The emission of VOCs is undesirable as they may be harmful to humans, wildlife, and the environment.

While it is possible to process the feed water prior to evaporation to remove VOCs therefrom, such practice is currently uncommon due to the additional costs associated therewith.

There exists a need for improved methods and apparatus for more efficient treatment of water and removal of contaminants such as volatile organic compounds (VOCs) therefrom.

SUMMARY

A water treatment system is provided for removing contaminants from feed water, including the removal of VOCs. The system receives feed water at a stripper tower, which removes VOCs from the feed water and directs the VOCs to a heating stage to be eliminated. Hot gases are directed from the heating stage to an evaporation stage. The VOC-free water from the stripper tower is also directed to the evaporation stage. The hot gases are brought into contact with the VOC-free water and evaporates the water. The exhaust gases in the evaporation stage are vented. A slurry of precipitated solids and water are removed from the evaporation stage to be disposed of or directed to a decanter stage to separate the liquid portion of the slurry from the solids portion. The liquid portion can be directed back to the evaporation stage. In embodiments, the exhaust gases in the evaporation stage can also be recirculated to the stripper tower to act as stripping gas.

In some embodiments, waste heat from a waste heat source such as a flare stack, internal combustion engine, or generator can be used as a source of hot gases to evaporate water in the evaporation stage.

In a broad aspect, a process for the treatment of feed water, comprises: providing the feed water and a stripping gas to a stripper tower, wherein the feed water is separated into VOCs and VOC-free water; incinerating the VOCs at a heating stage and producing a heated gas; directing the VOC-free water from the stripper tower to an evaporation stage; directing the heated gas to the evaporation stage for evaporating the VOC-free water and producing an exhaust gas; and venting at least a portion of the exhaust gas.

In an embodiment, the evaporating of the VOC-water produces a slurry comprising a liquid and solids portion, and the process further comprises directing the slurry to a decanting stage for separating the liquid portion and solids portion; and directing the liquid portion back to the evaporation stage.

In an embodiment, the process further comprises bringing the heated gas and the VOC-free water into direct contact.

In an embodiment, the process further comprises directing the heated gas through a plurality of openings of a distributor and around a band of the distributor to disperse the hot gas into bubbles in the VOC-free water.

In an embodiment, the process further comprises directing a portion of the heated gas to the stripper tower to make up at least a portion of the stripping gas.

In an embodiment, the process further comprises directing at least a portion of the exhaust gas from the evaporation stage to the stripper tower to make up at least a portion of the stripping gas.

In an embodiment, the VOC-free water is treated with a sulfate to stabilize soluble metals.

In an embodiment, the process further comprises creating a vacuum in the evaporator stage to draw in the heated gases.

In an embodiment, the step of directing the VOC-free water from the stripper tower to the evaporation stage comprises directing the VOC-free water to two or more evaporation vessels.

In another broad aspect, a water treatment system for the treatment of feed water comprises: a stripper tower configured to receive the feed water and a stripping gas for stripping VOCs from the feed water and separating the feed water into VOCs and a VOC-free water; a heating stage configured to receive and incinerate the VOCs, creating a heated gas; and an evaporation stage configured to receive the VOC-free water from the stripper tower and the heated gas from the heating stage and vent an exhaust gas.

In an embodiment, the system further comprises a gas conduit extending from the heating stage into the evaporation stage and terminating below a water level thereof for directing heated gas thereto.

In an embodiment, the gas conduit comprises a distributor portion comprising a conical portion; and a band portion extending from the conical portion; wherein at least the conical portion comprises a plurality of openings, and wherein the band portion comprises a circumferential lip having a profile.

In an embodiment, the profile is one of an irregular, regular, sawtooth, castellated, corrugated, serrated, and undulating profile.

In an embodiment, the system further comprises a decanting stage configured to receive a slurry created in the evaporation stage and separate the slurry into a liquid portion and a solids portion.

In an embodiment, the decanting stage is configured to direct at least a portion of the liquid portion to the evaporation stage and direct the solids portion to a solids collection stage.

In an embodiment, the system further comprises a recirculation line extending between the evaporation stage and the stripper tower for directing exhaust gases from the evaporation stage to the stripper tower to make up at least a portion of the stripping gas.

In an embodiment, the heating stage is configured to incinerate the VOCs at about 800° C. or greater.

In an embodiment, the evaporation stage comprises two or more evaporation vessels, each of the evaporation vessels receiving heated gases from the heating stage, a first evaporation vessel of the two or more evaporation vessels receiving the hot gases and VOC-free water and producing a slurry, and each subsequent vessel of the two or more evaporation vessels receiving the hot gases and the slurry of a prior evaporation vessel as a subsequent feed stream and producing slurry and exhaust gases.

In an embodiment, the system further comprises a decanter stage configured to receive the slurry created in one or more of the two or more evaporation vessels, separate the slurry into a liquid portion and a solids portion, direct the liquid portion back to the evaporation stage, and direct the solids portion to a solids collection stage.

In another broad embodiment, a water treatment system for the treatment of feed water comprises: an waste heat source generating heated gas; an evaporation stage configured to receive the feed water and the heated gas from the waste heat source and vent an exhaust gas through an exhaust line; a blower located on the exhaust line for creating a negative pressure in the evaporation change and drawing heated gas from the waste heat source through the evaporation stage and out the exhaust line.

DETAILED DESCRIPTION

Herein, Total Dissolved Solids (TDS) are referred to as a measure of the total organic and inorganic molecules ionized in a liquid. The term Volatile Organic Compounds (VOCs) is used herein to refer to both organic and inorganic chemicals that have a high vapor pressure at ordinary room temperatures, for example at 20° C.

Embodiments herein describe a water treatment system and method for cost-effective wastewater removal. Certain embodiments of the water treatment system provide for zero liquid discharge, with the only products of the system being removed contaminants and water vapor.

Figure 1A:
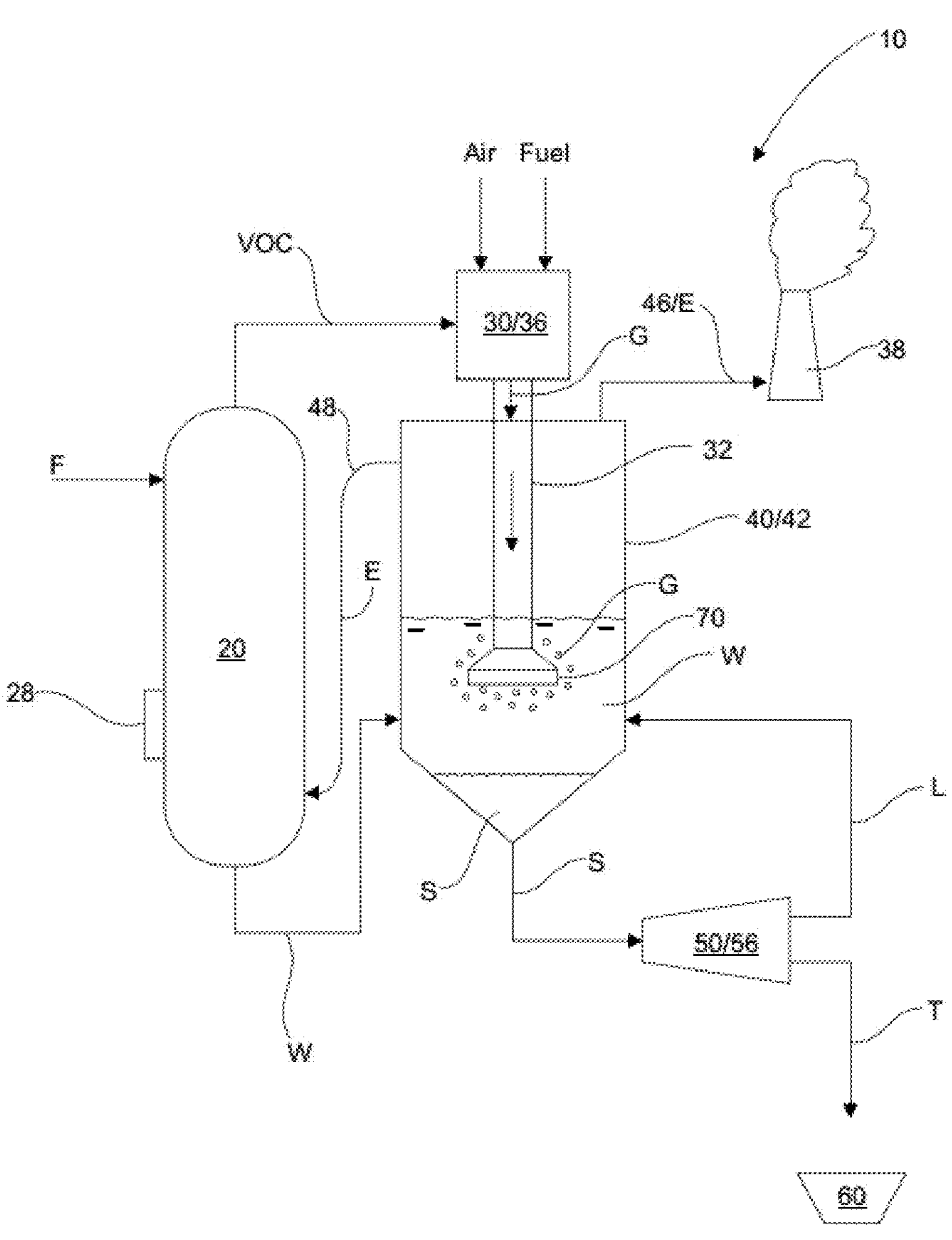
FIG. 1A is a schematic illustration of an embodiment of a water treatment system having an evaporator tank.
Figure 1B:
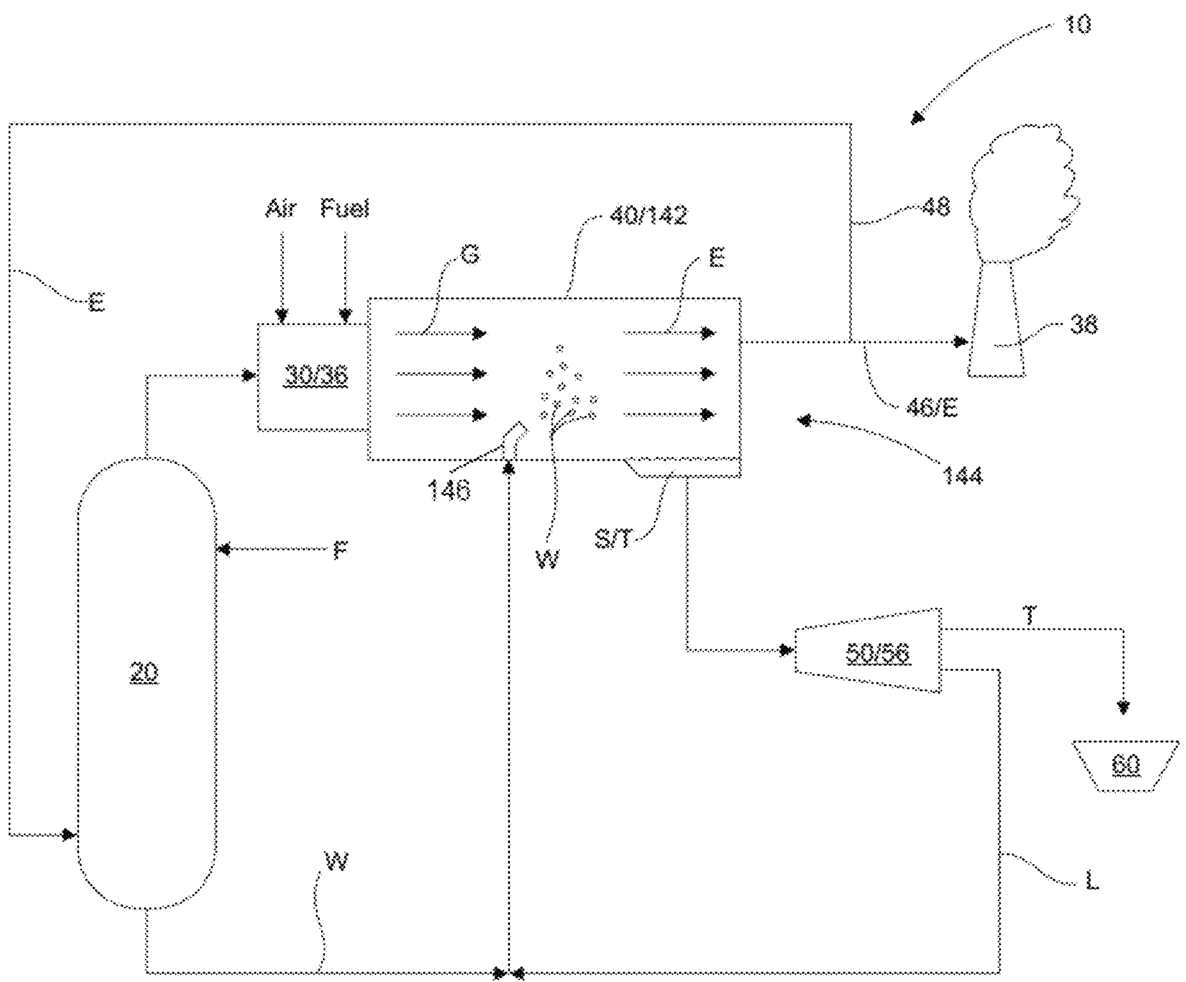
FIG. 1B is a schematic illustration of an embodiment of a water treatment system having an evaporation conduit.
Figure 1C:
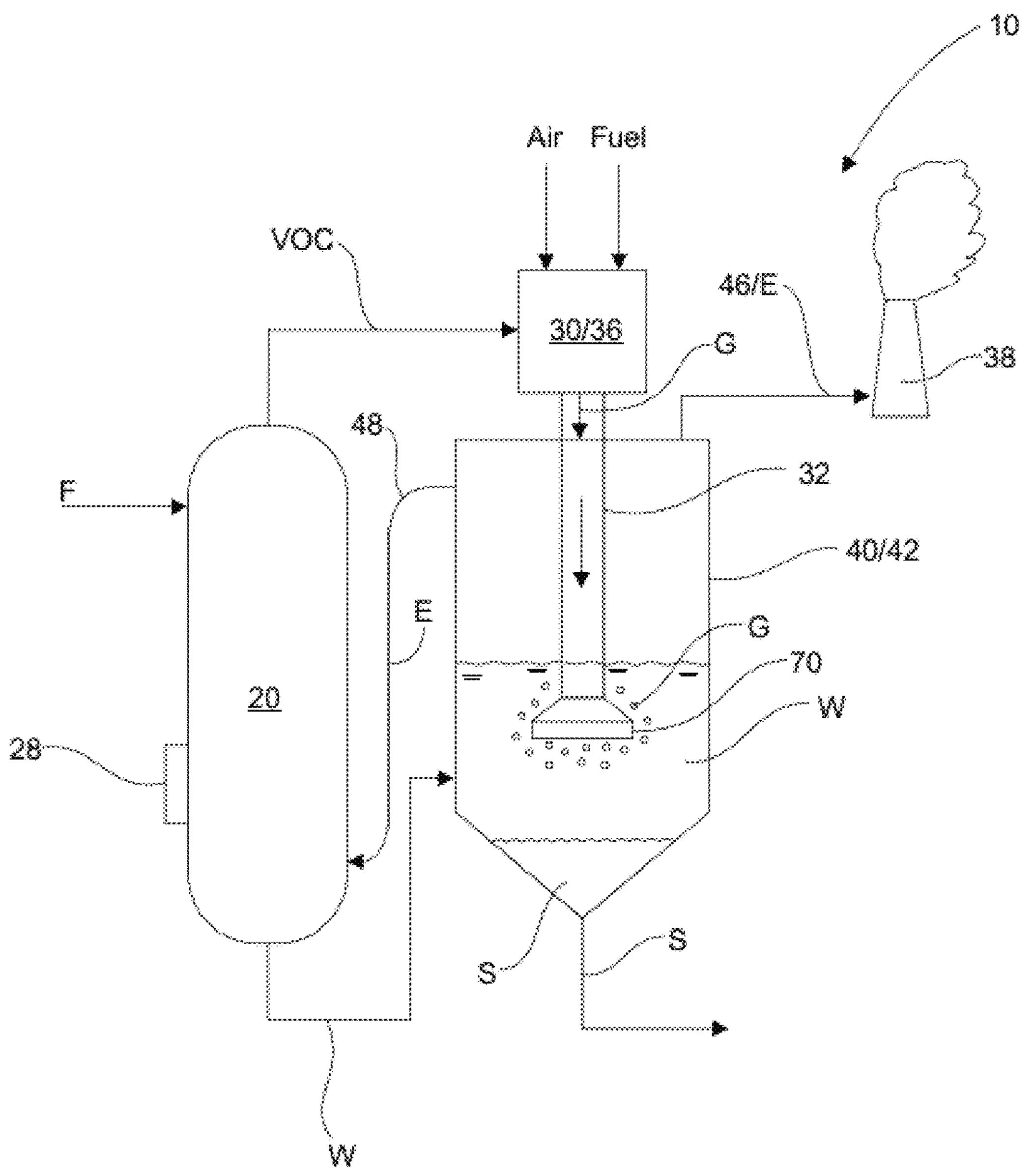
FIG. 1C is a schematic illustration of an embodiment of a water treatment system without a separation/decanting stage.
Figure 2:
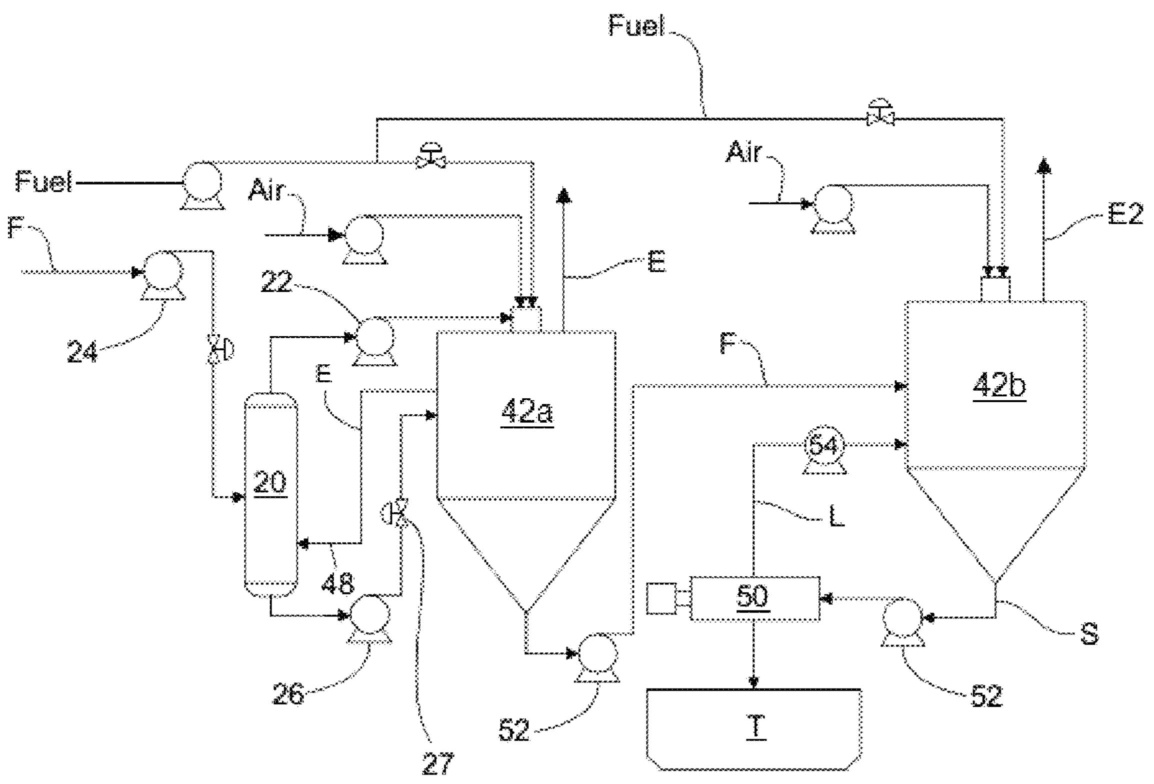
FIG. 2 is schematic illustration of an embodiment of a water treatment system having two evaporation vessels.

With reference to FIGS. 1A-2, in an embodiment, a water treatment system 10 receives a feed water stream F at one or more stripping towers 20, wherein the feed water F is brought into contact with a stripping gas to remove VOCs therefrom. Such VOCs include, but are not limited to, hydrocarbons as well as light non-hydrocarbon components such as ammonia and $H_2S$. Stripping tower 20 can be any suitable stripping tower known in the art, such as a packed column. The VOC-free feed water W is then directed to evaporation stage 40 while the VOCs are directed to a heating stage 30 where they are incinerated/combusted and effectively removed. The hot flue gases G from the heating stage are fed to evaporation stage 40 to evaporate the water W therein, creating exhaust gases G containing water vapor which can be vented.

In embodiments, a portion of the exhaust gas E is recycled from the evaporator stage 40 to act as stripping gas in the stripping tower 20. If high heat, i.e. above ambient temperatures, is not required to achieve the stripping requirements, ambient air or any other suitable gas can be used as the stripping gas. A portion of the hot gases G can also be directed from the heating stage 30 to the stripping tower 20 to act as the stripping gas.

If desired, chemical treatment of the water, such as pH control, antifoaming, or descaling, can be performed in the stripping tower 20 or the evaporation stage 40, for example to remove any leachable compounds such as barium chloride, radium chloride, or those regulated by Class II landfills in Alberta. Solids in the water W reach their saturation point in the evaporator 40 and precipitate out of solution, forming a slurry S.

The slurry S can be disposed of (see FIG. 1C) or, in some embodiments, as shown in FIGS. 1A, 1B, and 2, the slurry stream S is fed into a separation or decanting stage 50 for further processing. In embodiments, a centrifuge 56 may be used in the decanting stage 50. The difference in densities between the suspended salts and liquid in the slurry S is magnified by the increased gravity experienced by the slurry S in the centrifuge 50. The centrifuge 50 thereby separates the slurry S into a liquid portion L and a solids portion T, such as comprising heavier salts. The solids portion T, now separated from the liquid component L, are transferred into a solids collection stage 60 where they are disposed of or further processed.

The components of the treatment system 10 are described in further detail herebelow.

VOC Stripping Tower

In embodiments, with reference to FIGS. 1A, 1B, and 2, feed water F is pumped into VOC stripping tower 20, such as with a feed water pump 24, for removal of VOCs therefrom via contact with a stripping gas. While a single stripping tower 20 is shown in the drawings, multiple stripping towers 20 can be arranged in parallel or series, for example to increase throughput of the system 10. The stripping gas migrates up through the packed stripping tower 20 and contacts the feed water F as it flows down the tower 20, thereby removing VOCs therefrom. In embodiments, a metering flow meter can be located at the discharge end of the feed water pump 24, which may be used to monitor performance of the system 10 or for billing purposes.

The stripping gas can be any gas having sufficient temperature and, in some embodiments, desirable chemical properties to remove VOCs from the feed water F. Lower temperature gas such as ambient air may be used as the stripping gas if the VOCs in the feed water F can be stripped at relatively low temperatures.

With reference still to FIGS. 1A, 1B, and 2, the stripping air for the stripping tower 20 can be a recycled stream of exhaust gas E from the head space of evaporator vessel. A stripping air blower 22, for example a centrifugal blower having a variable-frequency drive (VFD) attached to a motor controlled by a flow transmitter of the stripping tower 20 for maintaining constant vapor flow, can direct exhaust gas E from the evaporator 40 to the stripping tower 20. The stripping air blower 22 directs the VOC output of the stripping tower(s) 20 back into the heating stage 30, creating an exhaust gas recycle. The stripping air blower 22 can be located on recirculation line 48 to pull exhaust gas E from the evaporation stage 40 to the stripper tower 20. Alternatively, as shown in FIG. 2, the stripping air blower 22 can be located on the VOC outlet line of the stripper tower 20 to maintain a constant vacuum at the VOC outlet of the stripping tower 20 to pull exhaust gas E through the stripper tower 20 and aid in VOC removal therefrom. The VOC gas stream is sent to the heating stage 30 for elimination/incineration. In this manner, the stripping tower 20 and heating stage 30 function as an exhaust gas E recycle, reducing NOx emissions from the system 10.

In other embodiments, a portion of the heated gas G from heating stage 30 can be used as the stripping gas.

VOC-free water W from the stripping tower 20 can be removed from the stripping tower sump, for example using gravity or VOC-free brine pump 26. In embodiments, the pump 26 has a control valve 27, for example on the discharge end. The state of the control valve 27 can be varied depending on the water level in the sump of the stripping tower 20 to maintain the water level within a set range.

Optionally, a chemical dosing system 28 can be configured to draw VOC-free water W from both the evaporation stage 40 and the VOC stripping tower 20 to serve as the motive liquid for an eductor. A sulfate such as calcium sulfate can be fed into the eductor, such as via an auger, creating a slurry which is added to the evaporation stage 40. The ratio of sulphate addition can be controlled based on the feed water flow rate, for example via a VFD.

Heating Stage

In embodiments, as shown in FIGS. 1A, 1B, and 2, the heating stage 30 comprises a burner 36 that receives air and fuel from respective air and fuel sources and maintains a combustion reaction therein. Natural gas or any other suitable fuel may be used for the combustion reaction. VOCs are directed into the burner 36 from the stripping tower(s) 20 to be incinerated, eliminating the VOCs and assisting the combustion process. The heating stage 30 directs the hot flue gases G generated by the combustion reaction into the evaporation stage 40, such as via a gas conduit 32 extending between the heating stage 30 and evaporation stage 40, such that the gases G contact and evaporate the VOC-free water W of the evaporation stage 40.

In other embodiments, the heating stage 30 can comprise any other suitable heat source, such as an electric heating element, an inductively heated element, or a heated fluid circulated through the heating stage 30 and configured to contact the incoming VOCs. Any heating means known in the art that can provide sufficient heat to eliminate the VOCs and generate a gas G having sufficient temperature to evaporate the water W in the evaporation stage 40 may be used.

In an embodiment, the heating stage 30 can be operated to heat incoming VOCs to about 800° C., which applicant has found to be sufficient to incinerate most VOCs found in feed water. The temperature in the heating stage 30 can be selected or adjusted accordingly to eliminate the VOCs that are anticipated to be found in the feed water of the particular application.

As described in further detail below, the heating stage 30 is configured to direct hot gas G to the evaporation stage 40 to evaporate the VOC-free water W therein.

Evaporation Stage

In an embodiment, the evaporator stage 40 can comprise at least one evaporation vessel 42. In FIG. 1A, evaporation vessel 42 is shown as an evaporation tank having a cone bottom, the gas conduit 32 from the heating stage 30 extending into the tank for directing hot gases G thereto.

In the embodiment depicted in FIG. 1A, the gas conduit 32 extends from the heating stage 30 to below a water level in the evaporation vessel 42 such that the hot gases G form bubbles in the water W. The bubbling of the gases G through the water W further drives evaporation of the water, as the direct heat transfer between gas bubbles G and water W provides for efficient heat transfer therebetween. Additionally, the corrosion and fouling associated with direct metal contact with heating surfaces is avoided. The water vapor and hot gases G rise in the evaporation vessel 42 as exhaust gas E which is vented, for example through stack demisters or to another process. As described above, a portion of the exhaust gases E can also be directed back to the stripping tower(s) 20 to act as stripping gas, which has the advantage of creating an exhaust gas recycle and reducing NOx emissions from the system 10.

As gas bubbles G move through the water F in the evaporator tank 42, heating and evaporating the water F, solids precipitate out and settle to the bottom of the evaporator as slurry S, which can be disposed of or transported to decanting stage 50, as described in further detail below.

In embodiments, the exhaust gases E vented from the system 10 can be directed to exhaust stacks 38 designed to filter small water droplets entrained in the exhaust E. The stacks 38 are configured to reduce the velocity of exhaust gases E to support gravity separation of water droplets therefrom. For example, the stacks 38 can provide a series of meshes, a tortuous flow path, or a two-stage demister system for the exhaust gases E to flow through to coalesce the water droplets. The coalesced droplets can be directed back into the evaporator stage 40.

In embodiments, the evaporation vessel 42 runs at slightly positive pressure relative to ambient air, for example due to pressure generated by a combustion air blower located between the heating stage 30 and evaporation stage 40 and configured to deliver hot gases G from the heating stage 30 to the evaporation stage 40. The positive pressure in the evaporation stage 40 pushes the exhaust gases E generated from the evaporation of the VOC-free water F therein out of the evaporation stage 40 to be vented and/or recirculated to the stripping tower(s) 20.

In other embodiments, the evaporation vessel 42 can run at a negative pressure, such as due to a vacuum generated by an exhaust blower located along an exhaust line 46 of the evaporation stage 40. The negative pressure in the evaporation stage 40 pulls flue gases G from the heating stage 30 into the evaporation stage 40 and also pulls exhaust gases E out through the exhaust line 46 to be vented. If exhaust gases E are to be circulated to the stripping tower(s) 20, a separate blower (not shown) can be located on a recirculation line 48 between the evaporation stage 40 and stripping tower(s) 20 to draw exhaust gases E to the tower(s) 20.

Instruments can be located at the evaporation stage 40 to measure process variables including temperature, pressure, level, and density of the fluids in the tank. Such measurements can then be used to assist in the efficient operation of the evaporation stage 40, for example to manage foam levels therein.

With reference to FIG. 1B, in alternative embodiments, the evaporation stage 40 comprises an alternative evaporation vessel 142 comprising a conduit configured to receive hot gases G from the heating stage 30, such as via the gas conduit 32, and direct said gases G toward an outlet end 144 of the vessel 142. A mister, sprayer, or similar device 146 can be located in the evaporation vessel 142 and configured to receive VOC-free water W from the stripping tower 20 and introduce the water W into the stream of hot gases G, preferably as droplets to provide a large surface area exposed to the gases G. Similar to embodiments having an evaporation tank 42, the water W is evaporated via direct contact with the hot gases G and solids are precipitated out either as a slurry S or as solid tailings T which settle at a bottom of the evaporation vessel 142. The slurry S or tailings T can either be disposed of or directed to decanting stage 50. The exhaust gases E, comprise of water vapor and hot gases G, can be vented from the evaporation vessel 142 and/or circulated to the stripping tower(s) 20 to act as stripping gas.

In some embodiments, the evaporation stage 40 can have multiple evaporation vessels 42,142 arranged in series or in parallel. For example, with reference to FIG. 2, two evaporation tanks 42 can be arranged in series, with a first evaporation tank **42*a* receiving the VOC-free water W from the stripping towers(s) 20 and hot gases G from the heating stage 30 to evaporate the water W therein. The exhaust gases E can be vented or recirculated to the stripping tower(s) 20 as described above, while the slurry S can be directed to a second evaporation tank 42*b* for further processing. At the second evaporation tank 42*b*, hot gases G from the heating stage 30 are brought into contact with the slurry S to further evaporate the water content therein. The exhaust gases E2 from the second evaporation tank 42*b* are vented, and a portion thereof can also be recirculated to the stripping tower(s) 20 if desired. The remaining slurry S can then be disposed of or transported to decanting stage 50**, if present.

The evaporation stage 40 can comprise more than two vessels, for examples vessels **42*a*, . . . ,42*i*, . . . ,42*n*, each connected in series such that the slurry S generated in a vessel 42*i* is directed to a subsequent vessel 42*i*+1 for further processing. The slurry S of the last vessel 42*n* can be disposed of or directed to the decanting stage 50**, if present.

While FIG. 2 shows two evaporation tanks 42 connected in series, other embodiments may comprise a combination of evaporation tanks 42 and linear evaporation vessels 142 connected in series.

In embodiments with multiple evaporation vessels 42,142, the heating stage 30 can comprise a single burner 36 or other heat source configured to direct hot gases G to each of the evaporation vessels 42,142, or the heating stage 30 can comprise multiple burners 36 or heat sources, each configured to provide hot gases G to respective evaporation vessels 42,142.

In embodiments, the evaporator stage 40 is designed to be mobile. In embodiments, the evaporator vessels 42/142 is sized to fit within a 11 foot wide body and within a common truck transportation height limit of 13 foot, 6 inches. Other equipment can be sized and fitted around these constraints as well. For example, the VOC stripper tower(s) 20 and heating stage 30 can be installed on site to reduce the bulk of the system 10 during transportation.

Decanting Stage

In embodiments, with reference to FIGS. 1A-2, the system 10 can have a decanting stage 50 for further processing slurry S from the evaporation stage 40. The decanting stage 50 can comprise a decanter centrifuge 56. Pumps, such as slurry pump 52 and discharge pump 54, can be connected to the decanting stage 50 for respectively delivering slurry S to, and separated liquid L from, the decanting stage 50.

The slurry pump 52 draws slurry S from the evaporation stage 40 to the decanting stage 50. In embodiments, the motor of the slurry pump 52 can have a VFD, and the speed of the motor 52 can be adjusted to meet the flow set point, for example to maintain ideal flow rate for separation of the liquid and solids portions L,T, and/or to avoid plugging of the tank and flow lines. The ideal flow rate for separation may change with slurry composition and may be adjusted by an operator as needed or automatically adjusted via a controller.

The decanter centrifuge 56 separates the slurry S into a solids fraction T and a liquid fraction L. Two operating parameters of the centrifuge 56 are the differential bowl speed and the overall speed of the centrifuge. These parameters may be entered by an operator and can be controlled by an independent motor and VFD. In embodiments, the solid fraction/tailings T from the centrifuge 56 can be analyzed periodically to verify empirical consistency, for example with a paint filter test, to ensure the water content of the tailings T does not exceed a predetermined level. In embodiments, flocculant may be added directly to the centrifuge 56 to aid in separation.

The solids fraction T discharged from the centrifuge 56 can be gravity fed or otherwise transported to a solids collection stage 60, which can comprise a collection unit or receptacle. In an embodiment, the collection unit 60 can have a winch attached thereto allowing movement of the unit 60 based on a predetermined feed TDS concentration. More specifically, if it is known that the feed water F and water W have a relatively high TDS, and thus will produce a greater amount of slurry S in the evaporation stage 40, then the collection unit 60 can be configured to move to more evenly distribute the solids T throughout to avoid spillage. The collection unit's position may also be monitored, such as via a video stream or electrical contacts between rails and the 60, and can be manually or automatically adjusted to evenly distribute solids T.

In the embodiment depicted in FIGS. 1A, 1B, and 2, discharge pump 54 recirculates the liquid fraction L from the decanting stage 50 back to the evaporation stage 40. By returning liquid portion L to the evaporation stage 40, the system 10 remains a closed liquid loop with zero liquid discharge, with any liquids in the system ultimately being evaporated in the evaporation stage 40 and vented or used in other parts of the system 10.

In other embodiments, instead of a decanter centrifuge 56, a passive decanting vessel 58 such as a settler can be used to permit the slurry S to separate under gravity into liquid portion L and solids portion T, which settle at the bottom of the decanting vessel 56. As above, the liquid portion L can be recirculated to the evaporation stage 40 while the solids portion T are removed to the collection stage 60.

For embodiments of the system 10 having multiple evaporation vessels 42,142, the decanting stage 50 can recirculate the liquid portion L back to select or all of the evaporation vessels 42,142. As shown in FIG. 2, in a preferred embodiment, the liquid portion L is circulated back to the final evaporation vessel 42,142 to concentrate corrosion caused by the contaminants in the slurry S to said final vessel. This provides advantages when maintaining the system 10.

Waste Heat Recycling

Figure 3:
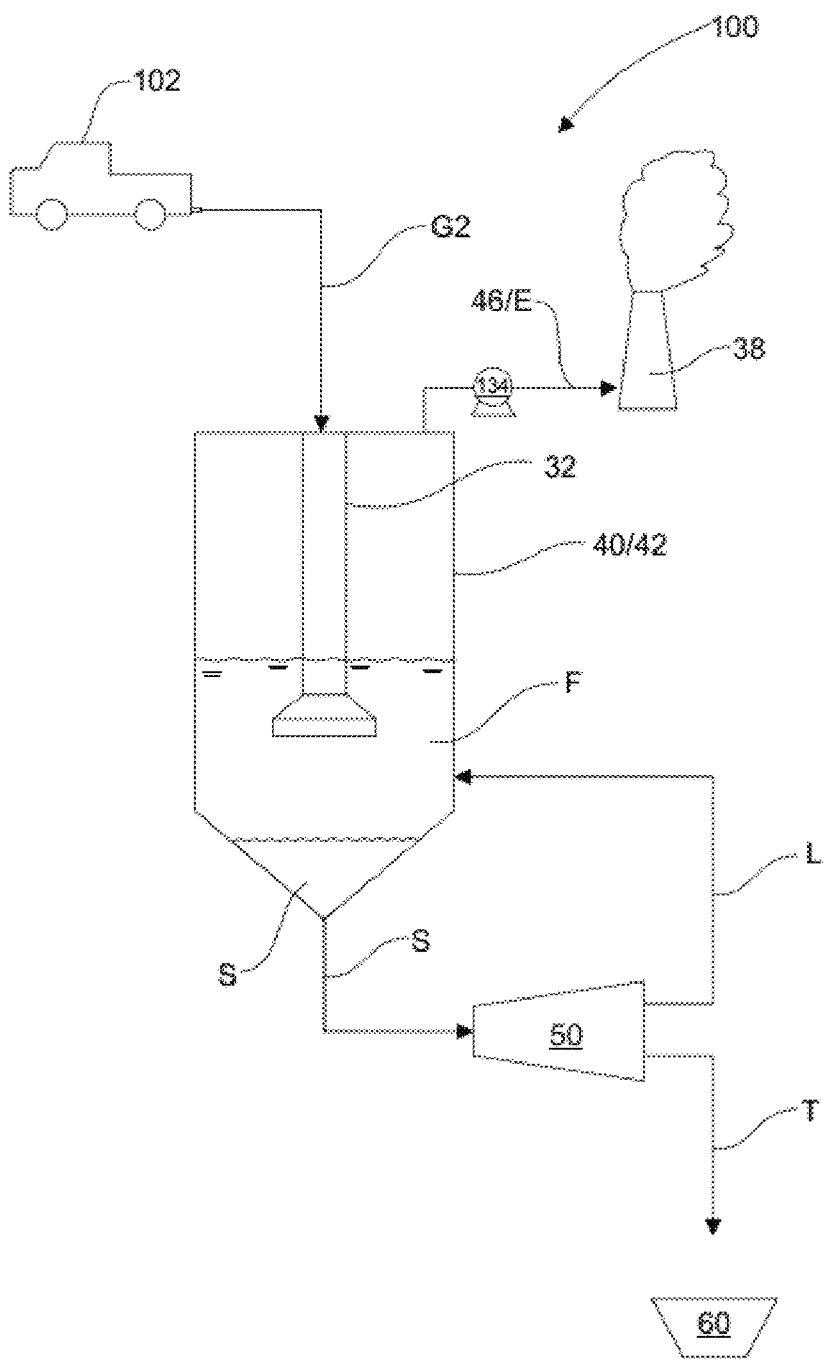
FIG. 3 is a schematic illustration of an embodiment of a water treatment system utilizing heat from a heat source, such as a waste heat source, to drive the evaporation process in the evaporation stage.
Figure 4A:
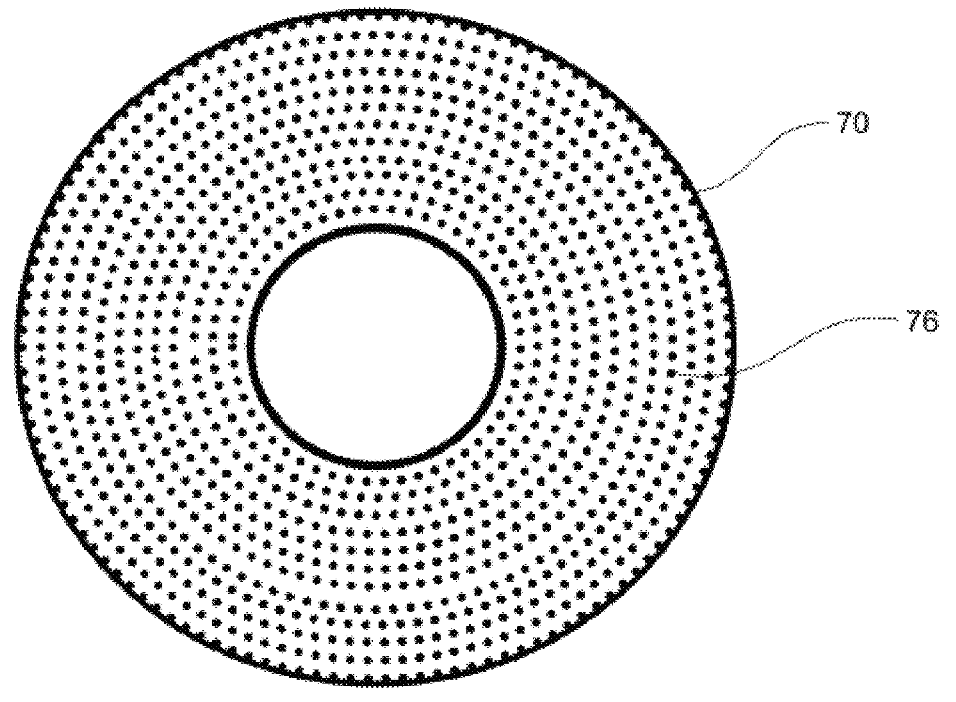
FIG. 4A is a top plan view of an embodiment of a distributor element of a gas conduit of a water treatment system.
Figure 4B:
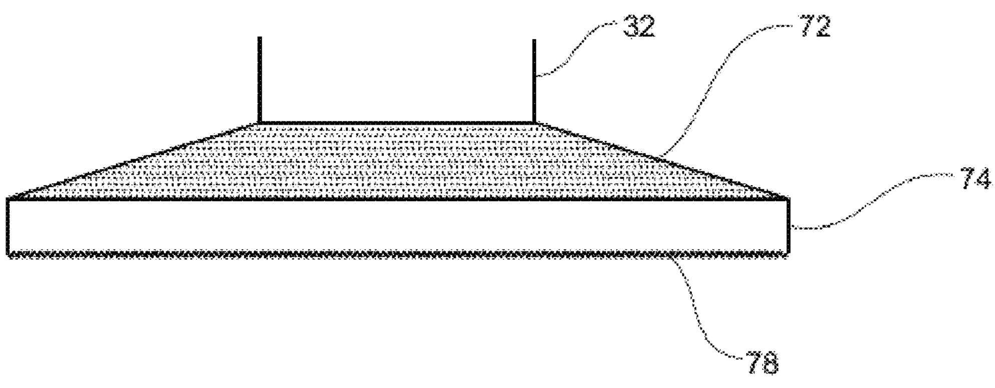
FIG. 4B is a side elevation view of the distributor of FIG. 4A.

With reference to FIG. 3, in an alternative embodiment, a waste heat recycling system 100 can be used to pull hot exhaust gases G2 from a nearby exhaust gas source 102 into the evaporation stage 40. The exhaust gas source 102 can be internal combustion engines, generators, flare stacks, or any other suitable source of hot exhaust gases G2, and conveyed into the evaporations stage 40 for evaporation of feed water F or VOC-free water W therein. In embodiments, a conduit 32 directs the gases G2 to contact the water F,W in the evaporation stage 40 for evaporation of the water F via direct contact therewith.

Waste heat blowers 134 can be positioned along an exhaust line 46 of the evaporation stage 40 to pull the exhaust gases G2 through the evaporation vessels 42,142. In such an arrangement, the waste heat blowers 134 are operated such that the pressure at the exhaust stack of the waste heat source 102 is slightly negative. In this manner, exhaust flows to the evaporator stage 40 instead of the stack. A knock-out drum can be provided to remove water droplets before the evaporated water is exhausted from the evaporator stage 40.

The creation of a vacuum in the evaporation stage 40 to draw hot exhaust gases G2 through the stage 40 is preferable to using positive pressure to push the gases G2 therethrough, as such positive pressure must be created from the exhaust gas source 102. This may stress the source 102, for example by running a internal combustion engine above its operating limits, and may not be feasible, as sources such as flare stacks do not create meaningful positive pressure. It also may not be practical to demand a specific pressure from the exhaust gas source 102.

Embodiments of the waste heat recycling system 100 may also feature VOC stripping towers 20 and/or decanting stages 50, or may be absent these stages. If VOC stripping towers 20 are present, a separate burner or other heat source may be required eliminate the VOCs therefrom, as the recycled exhaust gases G2 may not be hot enough to eliminate the VOCs. Stripping gas for the stripping towers 20 can be provided from the recycled exhaust gases G2, evaporation stage exhaust gases E, or another suitable source.

Distributor Design

Referring to FIGS. 1A, 1C, 4A and 4B, in an embodiment, the gas conduit 32 has a distributor element 70. The gas conduit 32 is a hollow generally tubular member having first and second ends, the first end being connected to heating stage 30 and the second end being open and submerged in the feed water F of the evaporator vessel 42. The distributor element 70 is located at the second end, and comprises a radially flared conical portion 72 extending from the second end of the conduit 32, a band portion 74 generally axially extending from the outer circumference of the flared portion 72. One or both of the conical portion 72 and the band portion 74 comprising a plurality of openings 76, and a lip 78 along the perimeter of the band portion 74 distal to the conduit 30. The lip 78 can have a profile such as a sawtooth profile, castellated profile, undulating profile, corrugated profile, serrated profile, or any other regular or irregular profile.

The plurality of openings 78 force the hot gas G from the burner 36 or other heat source of the heating stage 30 to form smaller bubbles to increase the contact surface area between the water W and gas G. The presence of the band portion 74 provides increased driving force through the plurality of openings 78. The profile of the lip 78 assists in breaking up bubbles of hot gas or flue gas G that escapes past the lip 78 instead of flowing through the plurality of openings 78 into smaller bubbles. The forcing of more gas G through the openings 78 creates more bubbles for more effective transfer of heat from the gas G to the water W in the evaporator section 40. Likewise, the breaking up of large gas bubbles into smaller bubbles presents more surface area for more efficient heat transfer.

In designing the distributor 70, the volumetric flow of hot gas G required to be moved through the distributer 60 can be determined. The height of the submerged distributor 70 is the driving force for the gas flow through the holes. The individual volumetric flow through each opening 78 can be determined based on pressure and opening size. Summation of the individual flows through the opening 78 lead to a cumulative gaseous flow through the entire distributor 70. In an embodiment, the distributor 70 is designed to have a slightly larger capacity for volumetric flow than theoretically required to account for possibly plugged holes.

Controls System Architecture

The plant may be monitored and controlled by a centralized off-site control room. Control from within the mobile skid allows the field operator to make process adjustments as seen fit. The controls system would allow for automatic control of the system 10 and the skid on which it operates, as well as an operator interface and historical data storage that can store operational history of the system 10.

What is claimed is:

1. A process for the treatment of feed water, comprising:

providing the feed water and a stripping gas to a stripper tower, wherein the feed water is separated into VOCs and VOC-free water;

incinerating the VOCs at a heating stage and producing a heated gas;

directing the VOC-free water from the stripper tower directly to an evaporation stage;

directing the heated gas to the evaporation stage for evaporating the VOC-free water and producing an exhaust gas, wherein the evaporating of the VOC-free water produces a slurry comprising a liquid portion and a solids portion; and directing the slurry to a decanting stage for separating the liquid portion and the solids portion;

directing the liquid portion back to the evaporation stage; and venting at least a portion of the exhaust gas;

wherein the process achieves zero liquid discharge.

2. The process of claim 1, further comprising bringing the heated gas and the VOC-free water into direct contact.

3. The process of claim 2, further comprising directing the heated gas through a plurality of openings of a distributor and around a band of the distributor to disperse the hot gas into bubbles in the VOC-free water.

4. The process of claim 1, further comprising directing a portion of the heated gas to the stripper tower to make up at least a portion of the stripping gas.

5. The process of claim 1, further comprising directing at least a portion of the exhaust gas from the evaporation stage to the stripper tower to make up at least a portion of the stripping gas.

6. The process of claim 1, wherein the VOC-free water is treated with a sulfate to stabilize soluble metals within the VOC-free water.

7. The process of claim 1, further comprising creating a vacuum in the evaporator stage to draw in the heated gases.

8. The process of claim 1, wherein the step of directing the VOC-free water from the stripper tower to the evaporation stage comprises directing the VOC-free water to two or more evaporation vessels.

9. A water treatment system for the treatment of feed water, comprising:

a stripper tower configured to receive the feed water and a stripping gas for stripping VOCs from the feed water and separating the feed water into VOCs and a VOC-free water;

a heating stage configured to receive and incinerate the VOCs, creating a heated gas;

an evaporation stage configured to receive the VOC-free water from the stripper tower and the heated gas from the heating stage and vent an exhaust gas; and a decanter stage configured to receive a slurry produced in the evaporation stage, separate the slurry into a liquid portion and a solids portion, direct the liquid portion back to the evaporation stage, and direct the solids portion to a solids collection stage;

wherein the system achieves zero liquid discharge.

10. The system of claim 9, further comprising a gas conduit extending from the heating stage into the evaporation stage and terminating below a water level in an evaporation vessel for directing heated gas thereto.

11. The system of claim 10, wherein the gas conduit comprises a distributor portion comprising a conical portion; and a band portion extending from the conical portion;

wherein at least the conical portion comprises a plurality of openings, and wherein the band portion comprises a circumferential lip having a profile.

12. The system of claim 11, wherein the profile is irregular, regular, sawtooth, castellated, corrugated, serrated, or undulating.

13. The system of claim 9, further comprising a decanting stage configured to receive a slurry created in the evaporation stage and separate the slurry into a liquid portion and a solids portion.

14. The system of claim 13, wherein the decanting stage is configured to direct at least a portion of the liquid portion to the evaporation stage and direct the solids portion to a solids collection unit.

15. The system of claim 9, further comprising a recirculation line extending between the evaporation stage and the stripper tower for directing exhaust gases from the evaporation stage to the stripper tower to make up at least a portion of the stripping gas.

16. The system of claim 9, wherein the heating stage is configured to incinerate the VOCs at about 800° C. or greater.

17. The system of claim 9, wherein the evaporation stage comprises two or more evaporation vessels, each of the evaporation vessels receiving heated gases from the heating stage, a first evaporation vessel of the two or more evaporation vessels receiving the hot gases and VOC-free water and producing a slurry, and each subsequent vessel of the two or more evaporation vessels receiving the hot gases and the slurry of a prior evaporation vessel as a subsequent feed stream and producing slurry and exhaust gases.

* * * * *